2,705,375

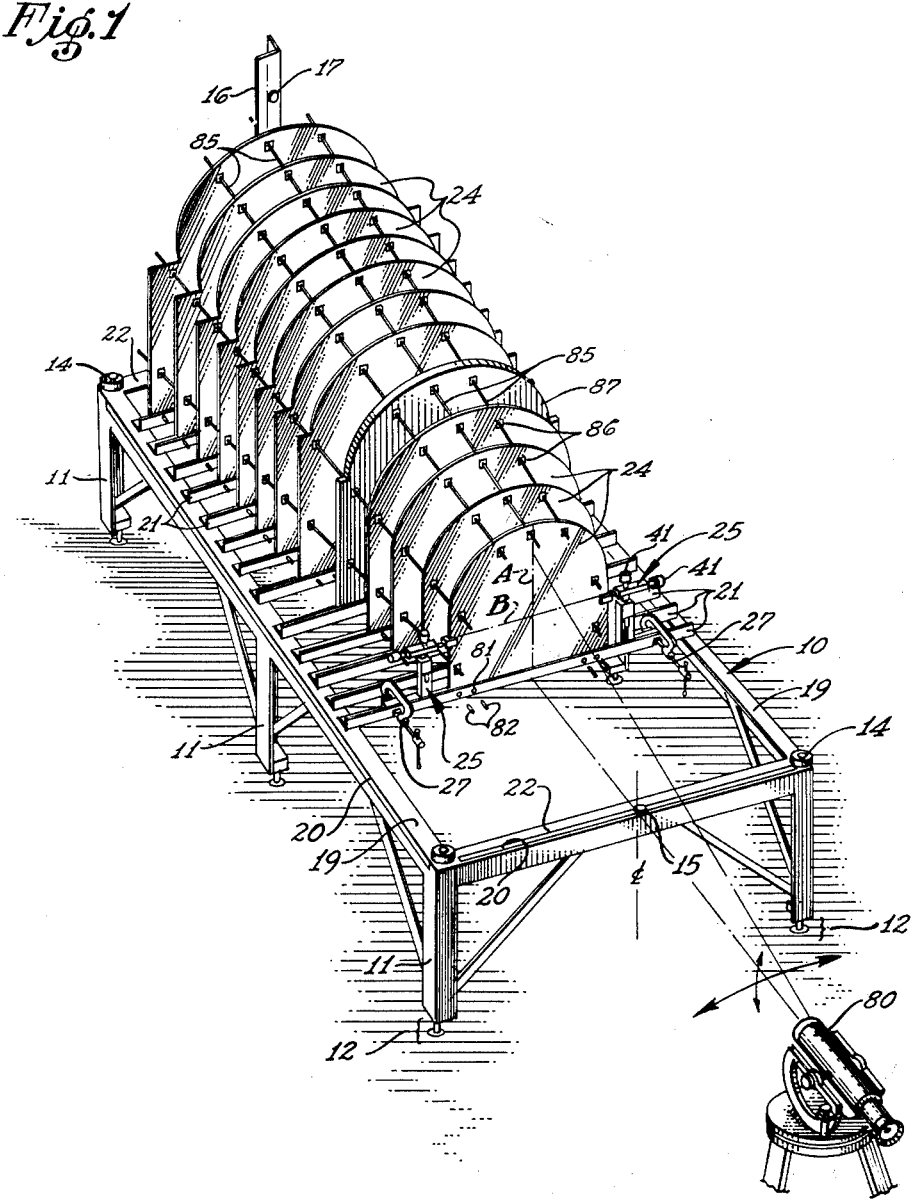

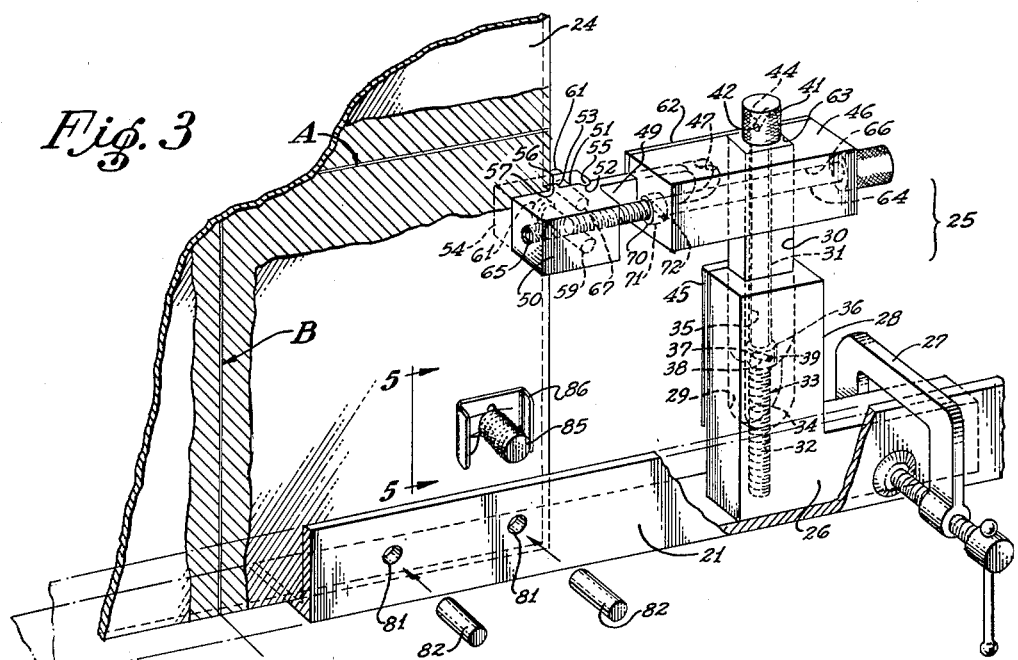
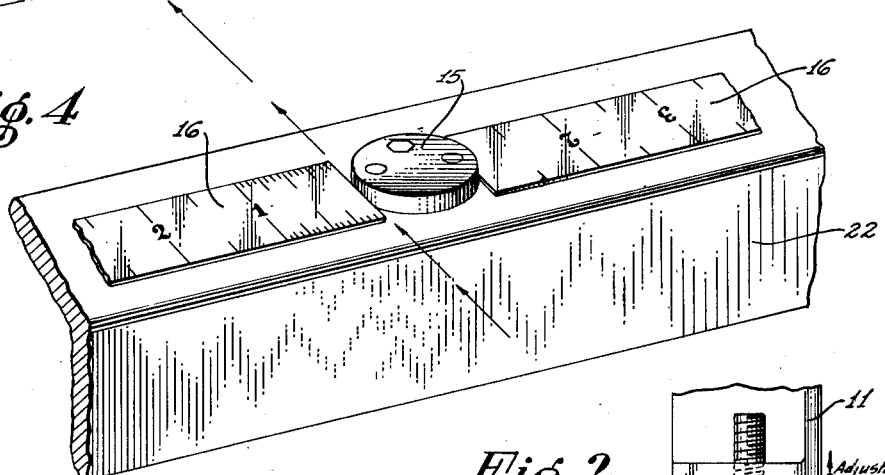
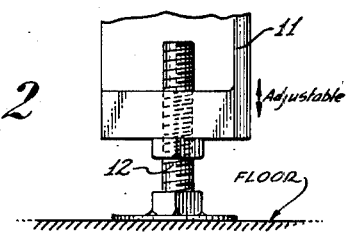
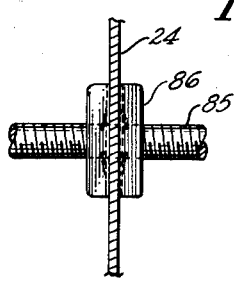
INVENTORS:
LONNIE G. FOREMAN
LAWRENCE OZENNE
THEIR PATENT ATTORNEY

United States Patent Office 2,705,375
Patented Apr. 5, 1955

LOCATING DEVICE

Lonnie G. Foreman, South Gate, and Lawrence Ozenne, Hawthorne, Calif., assignors to Northrop Aircraft, Inc., Hawthorne, Calif., a corporation of California Application June 23, 1952, Serial No. 294,974

1 Claim. (Cl. 33—174)

The present invention relates to a locating device and more particularly to a locating device which is ideally suitable for locating frame based structural templates or patterns in the horizontal and vertical planes with respect to predetermined reference points.

In the construction of models, mock-ups, jigs, etc., such as are used in the design and manufacture of ships, autos, tanks, and airplanes for example, it is the usual practice to first erect the framework of a particular design with metal templates or patterns which are usually traced directly from the engineering drawings thereof. The templates are normally arranged in series, and in proper order, along a constant center line in or on a base frame to define the configuration of the basic design.

The base frame for a mock-up for example, usually takes the form of a horizontal table of open framework having a number of legs extending to the floor on adjustable bases. A number of horizontal cross members are spaced at predetermined points lengthwise of the base frame. To these horizontal members the templates are mounted as will be shown and described herein.

One object of the present invention is to provide a device for holding and accurately locating templates or patterns in the horizontal and vertical planes with respect to predetermined reference points.

Another object of the invention is to provide a device for accurately locating templates with respect to the above mentioned reference points in a minimum of time, and with a minimum of manual effort.

It is still another object of the present invention to provide a locating device which is readily adaptable to templates or patterns of substantially any size or weight.

Many other objects and advantages will be readily seen as the specification of the present invention continues.

Briefly, the present invention in one preferred embodiment comprises a clamping member for supporting a template on a base, and adjustable locating means associated with the clamping member to move the supported template in either the vertical plane or the horizontal plane; or simultaneously in both planes if desired.

In order to more readily understand the present invention, the accompanying drawings are provided wherein;

Figure 1 is a view in perspective of one well known type of base frame with a number of templates arranged thereon to define a portion of a vehicle body.

Figure 2 is an elevational view of one adjustable base on one leg of the base frame of Figure 1.

Figure 3 is a fragmentary and somewhat diagrammatic view in perspective showing a template supported in one preferred embodiment of the device of the present invention.

Figure 4 is an enlarged fragmentary view of portion of the end member of the base frame of Figure 1 showing, in detail, a levelling button and measuring scale with respect to the reference lines A and B of the template of Figure 3.

Fig. 5 is a view partly in section and partly in elevation taken as indicated by the line 5—5 in Figure 3.

Referring first to Figure 1, a base frame 10 for a mock-up is provided with a number of legs 11, each resting on a vertically adjustable base 12 which is best shown in Figure 2. At each corner of the base frame 10 a leveling button 14 is provided as a reference point for the purpose of leveling the base frame 10 with respect to the floor. Intermediate each corner leveling button 14 and on one end of base frame 10 a central leveler button 15 is mounted to provide a center line reference point as well as a leveling reference point. At the other end of the base frame 10, a vertical member 16 is mounted having a center line button 17 mounted adjacent the top thereof and in line with the front leveling and center line button 15. Other leveling buttons can be mounted on the side frame members 19 to provide additional leveling points if desired. Between the leveling buttons 14, scales 20 are provided so that measurements can be easily made therebetween. One such scale 20 is shown in greater detail in Figure 4.

A number of template support cross members 21 are provided on the frame 10 and usually consist of angle irons which are attached to the side frames 19 and parallel to the frame end members 22, being spaced apart at predetermined points along the length of the base frame 10. A template 24 is supported in a support member 21, with the base of the template being held adjacent the vertical side of the cross member 21 by the locating device 25 of the present invention as shown in detail in Figure 3. The locating device 25 has a horizontal base leg 26 which is attached to the upright side of the cross member 21, being clamped thereto by a C clamp 27 for example. A vertical body block 28 extends perpendicularly from one end of the base leg 26, and is cut away intermediate the sides thereof to define a slide channel 29 in which is slidably mounted a slide block 30. A smooth bore 31 is provided through the slide block 30 extending perpendicularly from the base leg 26, and is coaxial with the vertical block 28. A threaded bore 32 is provided through the base leg 26 in coaxial alignment with the smooth bore 31 of the slide block 30. To move slide block 30 in slide channel 29, a drive screw 33 is extended through smooth bore 31 of slide block 30, being freely rotatable therein. Drive screw 33 consists of a rod having a threaded portion 34 at one end thereof and a smooth portion 35 at the other end thereof.

At the lower end of smooth bore 31 a counterbore 36 provides a recess in which a collar 37 around drive screw 33 is retained. A pin 38 is inserted through aligned lateral bores 39 in the collar 37 and drive screw 33 to retain the collar 37 thereon. Thus, while the drive screw 33 can rotate freely in the slide block 30, the slide block 30 is constrained from axial movement on the drive screw 33. The threaded end 34 of drive screw 33 is threadably engaged in the threaded bore 32 of base leg 26 and, when rotated therein, drives slide block 30 axially along slide channel 29. A knurled knob 41 is affixed the end of drive screw 33 which extends out the end of slide block 30, and is preferably retained thereon by a pin 42 extended through lateral pin bores 44 in the screw 33 and knob 41. To retain slide block 30 in the slide channel 29 of block 26, a face plate 45 is attached over the channel 29 and flush with the outer face of slide block 30. Removal of the face plate 45 then, facilitates removal or inspection of slide block 30.

At the upper end of slide block 30 is attached a horizontally disposed body block 46 having a slide channel 47 therein. Slidably mounted in slide channel 47 is slide block 49 having a clamp jaw 50 connected at one end thereof. One lateral face 51 of clamp jaw 50 has a round key slot 52 adjacent the inner end thereof, and a square key 53, each of which extend across the face 51 at right angles to the axis of slide block 49. Mating with clamp segment 50 is a separate clamp jaw 54 having a rounded key 55 which fits round key slot 52 of clamp jaw 50, and square key slot 56 which generally fits square key 53 on clamp jaw 50. Intermediate the round key 55 and square key slot 56 of clamp 54, a pair of threaded bores 57 are positioned, which are in alignment with a pair of threaded bores 59 provided in clamp jaw 50. For clamping a template 24, threaded bolts 61 are threadably extended through bores 57 and 59 and tightened to grip the template 24 between clamp jaws 50 and 54. It can be seen that round key 55 rotatably retained in round key slot 52 provides for templates of different thicknesses while square key 53 prevents slippage between jaws 50 and 54 with respect to their opposed faces.

A face plate 62 is provided to retain slide block 49 in slide channel 47 and additionally retain body block 46 in the vertical groove 63 provided in body block 46 to mount and retain body block 46 therein.

To move slide block 49 in slide channel 47 a smooth bore 64 extends coaxially through body block 46, being aligned with a threaded bore 65 through clamp jaw 50, and a drive screw 66 similar to drive screw 37 is extended through smooth bore 64 with the threaded end 67 of drive screw 66 threadably engaged in threaded bore 65 of clamp jaw 50. Smooth bore 64 has a counterbore 70 at the end thereof opposite clamp jaw 50 in which is recessed a collar 71 which encircles drive screw 66, being there affixed by pin 72 which extends through collar 71 and drive screw 66, and constrains slide block 52 from axial movement on drive screw 66.

For a description of the use of the locating device of the present invention; in Figures 1 and 3 a number of templates 24 have been serially erected on horizontal cross members 21 attached to the base frame 10, along a constant center line to define the general configuration and contours of a vehicle body for example. It is the usual practice in the erection of the templates as in the present example to start at one end and work toward a transit 80 which is trained along the center line; usually remaining at that position during the entire locating operation. Each template 24 is marked through the center thereof with a vertical reference line A and a horizontal reference line B which represent the zero point for preceding measurements.

To hold and locate the template 24 prior to attaching the template 24 to a cross member 21, the locating device 25 is mounted to the cross member 21, by use of a C clamp 27 as was described above, preferably using one locating device 25 on each side of the template 24 as in the present case. By rotating the drive screw knobs 41 of the locating devices 25, fine adjustments in the vertical and horizontal planes can be made to accurately locate the template 24. For the most efficient operation, a transit operator (not shown) sights through the transit 80, giving directions to an assistant who manipulates the locating knobs 41 until proper positioning of the template 24 is achieved. When the template 24 is properly located holes 81 are drilled through the vertical side of the cross member 21 and template 24, the template 24 then being securely attached to the cross member 21 by bolts or dowel pins 82 as shown for example.

To further retain the templates 24 in position on the base frame 10, a number of holes are spaced around the outer edges thereof, and threaded rods 85 extended therethrough, the templates 24 being coaxially adjustable along the rods 85 by means of Tinnerman nuts 86 or the like on either side thereof as best shown in Figure 5.

To bolster the complete template setup, it is usually advantageous to interpose a template 87 of substantially greater thickness, at one or more points along the extent of the mock-up as shown in Figure 1.

It can be mentioned that in relatively small mock-ups wherein the templates are relatively lightweight, one locating device will suffice.

It has thus been demonstrated that the locating device of the present invention, while simple and economical of construction, provides a highly accurate and efficient instrument for locating templates and the like with respect to vertical and horizontal plane reference points. While the application of the present invention has been illustrated in conjunction with mock-ups and model building, many other useful applications will be readily seen by those skilled in the art, such as for example in surveying, construction of buildings, bridges, etc.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claim.

What is claimed is:

A locating device comprising a first member having a substantially rectilinear slide channel therein, a slide block slidably mounted in said slide channel, said slide block having a smooth bore extending axially therethrough and coaxial with a threaded bore in said member, a drive screw having a threaded portion at one end thereof and an unthreaded portion at the other end thereof, the unthreaded portion of said drive screw being extended through the smooth bore of said slide block and rotatable therein, the threaded end of said drive screw being threadably engaged in the threaded bore of said first member, means associated with said drive screw to constrain said slide block from axial movement thereon, a second member mounted on one end of the slide block of said first member, means defining a substantially rectilinear slide channel in said second member and positioned therein to extend at substantially a right angle to the slide channel in said first member, a slide block slidably mounted in the slide channel of said second member, clamping means mounted on one end of the slide block of said second member, said clamping means having a threaded bore extending coaxially therethrough coaxial with a smooth bore through said second member, a drive screw having a threaded portion at one end thereof and an unthreaded portion at the other end thereof, the unthreaded portion of said drive screw being extended through the smooth bore of said second member and rotatable therein, means associated with said drive screw to constrain said second member from axial movement thereon, the threaded end of said drive screw being threadably engaged in the threaded bore of said clamping means, and means associated with each of said drive screws to rotate the threaded ends thereof in said threaded bores to drive said slide blocks along said slide channels.

References Cited in the file of this patent

UNITED STATES PATENTS

| | | |
|---|---|---|
| 205,291 | Neisser | June 25, 1878 |
| 289,179 | Tregurtha | Nov. 27, 1883 |
| 2,124,006 | Parker | July 19, 1938 |
| 2,371,451 | Larson | Mar. 13, 1945 |
| 2,504,961 | Braaten | Apr. 25, 1950 |